(12) United States Patent (10) Patent No.: US 6,394,037 B1
Smith (45) Date of Patent: May 28, 2002

(54) HORSE HAIR BRAIDING TOOLS AND METHODS FOR THEIR USE

(76) Inventor: Ruthann Smith, 27 Elmcrest Cir., Melrose, MA (US) 02176

( * ) Notice: Subject to any disclaimer, the term of this patent is extended or adjusted under 35 U.S.C. 154(b) by 0 days.

(21) Appl. No.: 09/707,785

(22) Filed: Nov. 7, 2000

Related U.S. Application Data

(60) Provisional application No. 60/164,644, filed on Nov. 10, 1999.

(51) Int. Cl.$^7$ ............................................... A01K 13/00
(52) U.S. Cl. ........................... 119/601; 54/78; 132/212; 132/200; 87/25
(58) Field of Search .............................. 54/78; 132/212, 132/200; 119/600–630

(56) References Cited

U.S. PATENT DOCUMENTS

| | | | |
|---|---|---|---|
| 3,347,018 A | 10/1967 | Laidig | 54/78 |
| 5,022,350 A | 6/1991 | Sequist | 119/85 |
| 5,086,612 A | 2/1992 | Anderson | 54/78 |
| 5,275,182 A | 1/1994 | Northcutt | 132/144 |
| 5,279,255 A | 1/1994 | Northcutt | 119/83 |
| 5,417,230 A | 5/1995 | Wood | 132/212 |
| 5,694,750 A | * 12/1997 | Allen | 54/78 |
| 5,782,068 A | 7/1998 | Flint | 54/1 |
| 5,810,022 A | 9/1998 | Reynolds | 132/200 |
| 5,860,198 A | * 1/1999 | Buntin, Jr. | 24/600.5 |
| 6,062,232 A | * 5/2000 | Johnson | 123/273 |

* cited by examiner

Primary Examiner—Charles T. Jordan
Assistant Examiner—Stephen Holzen
(74) Attorney, Agent, or Firm—Sharon M. Webb; Foley, Hoag & Eliot, LLP

(57) ABSTRACT

The present invention provides tools, kits and methods for braiding animal hair, in particular hair of the horse's mane. Tools include a pulling tool, a cutting tool and a cutting comb. The pulling tool and the cutting tool are attachable to ends of a cord that retains them in a convenient position for the groomer to use. The tools may be assembled in a kit for easy use. Methods are disclosed for the use of these tools to braid the animal's mane in an aesthetically desirable manner.

11 Claims, 3 Drawing Sheets

HORSE HAIR BRAIDING TOOLS AND METHODS FOR THEIR USE

RELATED APPLICATIONS

The present application claims priority to Provisional Patent Application No. 60/164,644, filed Nov. 10, 1999, the contents of which are incorporated by reference.

BACKGROUND OF THE INVENTION

1. Field of the Invention

The present application relates to tools for grooming animal manes, kits thereof and methods for the use of said tools and said kits.

2. Description of the Related Art

A horse's mane is an outgrowth of hair along the dorsal aspect of the horse's neck. In general, the hair of the main is coarse and longer than the hair of the surrounding coat. If left untended, the mane will generally appear unruly. The mane hair can extend out at varying angles and can be of uneven lengths.

Skilled artisans in the field of horse grooming have devised methods for braiding horse manes to make the horse's hair look stylish and to compensate for faults in the horse's physical conformation. Further, a well groomed mane is understood to attract favorable attention to the horse in the show ring setting. To be properly groomed, the mane must be clean, trimmed and arranged in an aesthetically pleasing manner.

Aesthetics of a well-groomed mane are familiar to horse groomers and show judges. For example, it is important that the braids stay straight and flush to the neck. If there are too many braids, they are unstable, breaking up a clean neck line. Braids should be tight, uniform in width, sturdy and fine. The proper number of braids should be determined by the size and shape of the horse's neck. Braids act as an optical illusion, drawing the eye to the line of the braids instead of to any irregularities in the top line of the neck. Braids, therefore, may be different lengths if there is an arch or dip in the crest. The angle is cheated so the braids are slightly longer toward the poll than the withers. This holds true for a French-braided mane which should not drape down toward the shoulder, but lay on the edge of the crest. The line pitched as such makes the horse look rounder as it goes and closes off the throughtlatch a bit. Certain proportions of braids make the neck look long and refined or thick and short.

At times prior to initiating the braiding process, the practitioner may need to shorten the hairs of the horse mane or tail. For this purpose, some sort of cutting tool can be employed. Certain cutting tools are familiar within the art. For example, scissors can be used to cut hair to shorten it. Scissors, however, cut the hair bluntly even if used at an angle, making it more difficult to keep the braided mane tightly knotted for an aesthetic appearance. Combining scissors and a thinning comb does not alleviate this problem. Furthermore, the kit containing both utensils has a handled comb that is cumbersome and difficult to control. A tool called a grooming and thinning knife is intended to avoid the blunt cutting of scissors. This tool resembles a jack knife whose blade portion has teeth. The teeth, however, are too short to tease the horse's hair as needed for an effective cut, and the handle makes the tool difficult to maneuver. A clipper blade (Oster, size 84AU) is made to fit the large clippers used for clipping the horse's winter coat. This blade is dimensionally adapted for the specific clipper machine upon which it is used, and bears grooves and holes for its affixation thereupon. The clipper blade set contains a top blade and a partner bottom blade. While the top blade can be used without the clipper machine to cut the horse's hair freehand, the shape of this blade is not specifically adapted to this purpose. Furthermore, used freehand, this blade is difficult to control, posing safety risks for the groomer and the horse and interfering with precision cutting. A pulling comb can be used to pull hair out by the roots, thereby to shorten it. However, pulling the hair out is unnecessary under circumstances where the hair is simply uneven at the bottom, and pulling the hair out is contraindicated when the mane or tail is thin. A device called the Grooma Mane Master combines a comb with a blade to permit controlled shortening of horsehair. The device has a comb with a handle and a lever. Pressing the lever engaged a blade to move out of the base of the comb. This device, however, is cumbersome to use and difficult to control. Furthermore, its mechanism and components make it expensive. Hence, while a number of products are marketed for the purpose of cutting the horse's mane or tail hair, there remains a need in the art for a device that is easy to control, simple in design and accurate to use.

In general, the braiding process itself involves weaving strands of hair around each other and weaving yarn through the strands of hair. The final assemblage can then be folded onto itself against the neck of the horse so that the array of braids are in a straight line down the neck. A variety of previous patents have offered tools for aspects of braiding, for example, U.S. Pat. Nos. 5,810,022, 5,782,068, 5,417, 230, 5,279,255, 5,275,182, and 5,022,350.

Certain types of tools are considered useful by practitioners of the art. A pullthrough or pulling device can be used for weaving the yarn through the braided hair and for pulling the completed braid onto itself. A pullthrough device can also be useful in braiding the forelock or the tail. Certain types of pullthrough devices are known in the art. For example, a braid pullthrough is available that is made of wire with an eye at one end and a hair-holding loop at the other end, in four inch and six inch lengths. The size and the stiffness of this device can limit its usefulness as an efficient braiding tool, however. Furthermore, this tool is not adapted for convenient access, since it lacks a loop, snap or other fastener to affix it in proximity to the user. Although not in use for horse braiding, a plastic device marketed under the name "Topsy Turvy" exists that can form human ponytails, but it is too large in scale to be used for horse manes, and its plastic composition prevents it from being adapted to custom shapes.

Assembling a collection of tools in a kit provides for easy access, facilitating convenient and safe use. Certain commercial products are known in the art that serve as kits adaptable to horse braiding. For example, a small leather pouch is available with sewn compartments that carry a pulling comb, mane clip, seam ripper, and a wire pull through. A similar product comprises a leather pouch with sewn compartments to house one hair clip, a seam ripper, pull though for pulling braid end and pulling comb. The pull through provided in this kit is a rug hook with a bent shank, a configuration with restricted usefulness. Another kit comprises a leather pouch with sewn compartments and a quick release nylon belt that houses two hair clips, seam ripper, needle, braid aid, pulling comb, and rug hook. Yet another kit comprises a leather pouch with compartments and a quick release nylon belt housing scissors, razor, spray bottle, two hair clips, seam ripper, needle, pulling comb, brush and rug hook. Each of these groupings includes tools that suffer from certain of the abovementioned limitations.

There remains in the art the need for a set of tools specifically adapted to the needs of horse hair grooming and braiding. There remains a further need for a kit to collect said tools and present them to the groomer in a convenient and accessible holder.

SUMMARY OF THE INVENTION

It is an object of the present invention to provide an apparatus for grooming horses or other animals that includes a flexible belt positionable around the neck of a groomer, a pulling tool affixable to one end of the flexible belt, and a cutter affixable to the other end of the flexible belt. The pulling tool has a loop that is dimensionally adapted for retaining a strand of yarn. The cutter is adapted for cutting yarn. The pulling tool and the cutter are affixed to the flexible belt at its ends, so that when the belt is positioned around the groomer's neck, the pulling tool and the cutter are each reachable by the groomer's hand. In certain embodiments, the flexible belt may bear a plurality of fasteners for attaching a plurality of tools to the belt. In one embodiment, the apparatus may further include a comb detachably attachable to the belt. In one embodiment, the comb may be graspable proximally with a plurality of teeth on its distal aspect, each of said teeth tapering as it extends distally, and each of said teeth being beveled proximally to provide at least one cutting edge.

It is another object of the present invention to provide a kit for grooming horses or other animals that includes a cord dimensionally adapted for positioning around a groomer's neck, a pulling tool affixable to the cord and a cutter for cutting yarn, also affixable to the cord. In certain embodiments, the pulling tool has a proximal handle and a loop positioned distally for carrying within it a strand of yarn. In one embodiment, the kit may also include a comb. In another embodiment, the comb may be graspable proximally with a plurality of teeth on its distal aspect, each of said teeth tapering as it extends distally, and each of said teeth being beveled proximally to provide at least one cutting edge. In yet another embodiment, the kit may include a comb that is affixable to the cord.

The present invention also provides methods for grooming horses or other animals. One practice of the present method comprises the steps of providing a grooming apparatus positionable around the neck of a groomer that includes a pulling tool and a cutter, positioning the grooming apparatus around the groomer's neck, separating a section of mane hair, braiding a first portion of the section, braiding a second portion of the section to include a strand of yarn, securing the strand of yarn when the complete braid has been formed, pulling with the pulling tool a distal end of the complete braid under the proximal portion of mane hair, securing the distal end under the proximal portion of horse mane hair, and trimming excess yarn with the cutter.

DESCRIPTION OF THE INVENTION

Figure 1A:
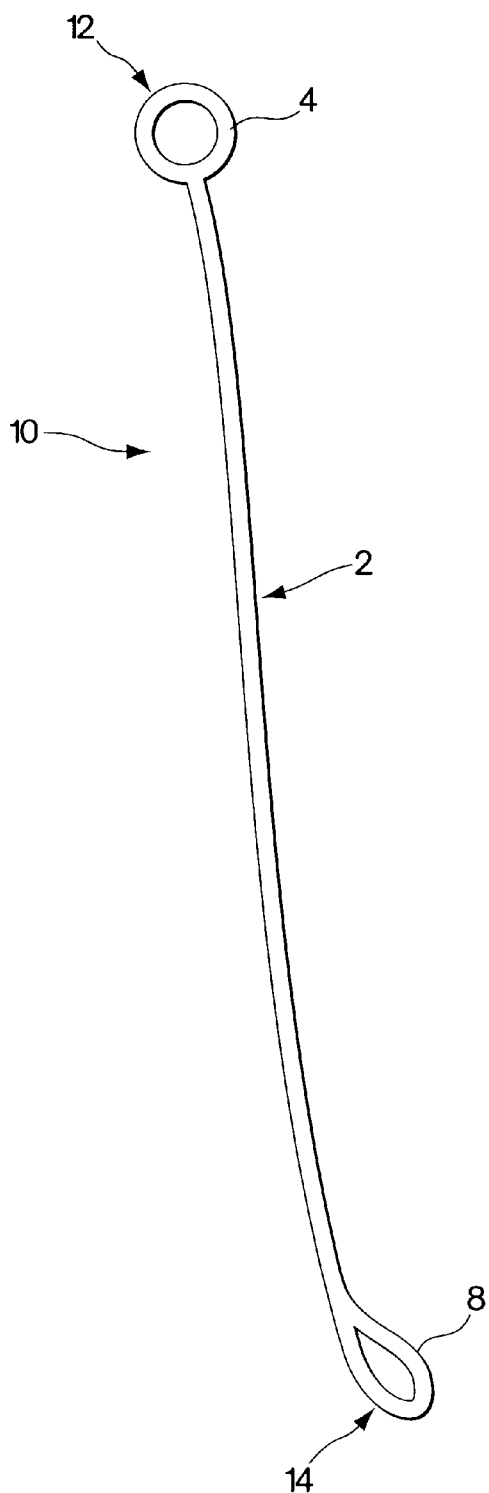
FIGS. 1A and 1B depict embodiments of a pulling tool according to the present invention.

In one embodiment, the present invention comprises a tool for grooming horses that includes an elongate member with a proximal and a distal end. The proximal end bears a fastener adapted for securing the tool to a flexible belt or to a cord. The distal end may be configured as a loop dimensionally adapted for retaining a strand of yarn therein to allow the yarn to be passed through a partially braided horse mane during the braiding procedure. The apparatus of the present invention is constructed to be positionable over the neck of a groomer, in such a position that the tools attached to the flexible belt are presented to the groomer's hands in a convenient way. A groomer is understood to be any person who is undertaking the task of braiding the mane of an animal. While the present invention is particularly described with respect to horse manes, with particular utility in the field of horse mane grooming, it is understood that the apparatus, kit and methods of the present invention may be applied to the grooming of other animals as well, in those situations where the described apparatus, kit and methods would be deemed useful for aesthetics or hygiene of the animal. While the present specification describes as a particularly preferred embodiment the application of this apparatus, this kit and these methods to horse mane grooming, other embodiments with applications to other species may be appreciable by practitioners in the relevant arts.

As used herein, the term fastener includes any mechanism whereby the tool may be fastened to a flexible belt or to a cord. A fastener may be a paired structure, such as a snap, where one partner of the pair is borne on the tool and the other mating partner of the pair is borne on the flexible belt or cord. A fastener may be an attachment strip such as a Velcro® type fabric. A fastener may be an adaptation of the shape of the proximal end such as a hook or an eye or a clasp enabling the tool to be attached to the flexible belt or cord. Other types of fasteners can be readily envisioned by practitioners in these arts. A flexible belt, as used herein, refers to any elongate flexible structure dimensionally adapted for positioning around the neck of a groomer. A flexible belt may be made from fabric, plastic, leather, or any other substance sufficiently comfortable to be worn around the neck for an extended period. The flexible belt may be a string, a chain, a belt, a piece of fabric, a padded rope, or any other suitable device. The flexible belt should have sufficient flexibility that it will not irritate the groomer's neck, and that it will allow a tool to be easily maneuvered while it is affixed thereto. As used herein, the term cord will have the same meaning as the term flexible belt. The term handle shall refer to any portion of a tool that is structurally adapted for being grasped in the hand. Handles may be round, oval, looped, or of any shape to permit grasping. A handle may have a particular surface that allows grasping to be more secure. A handle may have one or more cutouts or conformational alterations that are graspable by the palm, fingers, thumb or interdigital spaces of the groomer.

FIG. 1A shows one embodiment of a pulling tool according to the present invention. The tool 10 has a central elongate member 2 with a proximal end 12 and a distal end 14. The proximal end 12 bears a fastener 4, here depicted as a loop by which the tool 10 can be affixed to a flexible cord (not shown). The distal end 14 bears an elongated loop 8 dimensionally adapted for carrying a strand of yarn.

In the depicted embodiment, the tool 10 can be used like a needle would be, feeding the yarn through a section of horse hair. The tool 10 is long enough to slid behind the braided forelocks of large horses. It is desirable that the elongate member 2 of the tool 10 be somewhat malleable, so it can be bent to suit the angles required for certain braiding maneuvers. In one embodiment, the tool 10 is about six inches long. It may be made of a metal, a plastic, a ceramic or of any other appropriate material. In one embodiment, the tool 10 is made of wire folded in half with an opening at its distal end 14 that works like the eye of a needle. The fastener 4 at the proximal end 12 of the tool can include a wire, a plastic ring, a snap, a hook and eye, or any other fastener suitable for the purposes disclosed herein. In one embodiment, the tool 10 is used as follows: 1) the mane or tail of the horse is braided in one section; 2) yarn is used to knot the end of the braid; 3) the tool 10 is used to feed the yarn that has been used to form the knot back through the base of the braid; 4) the braid is tied around itself to secure it.

Figure 1B:
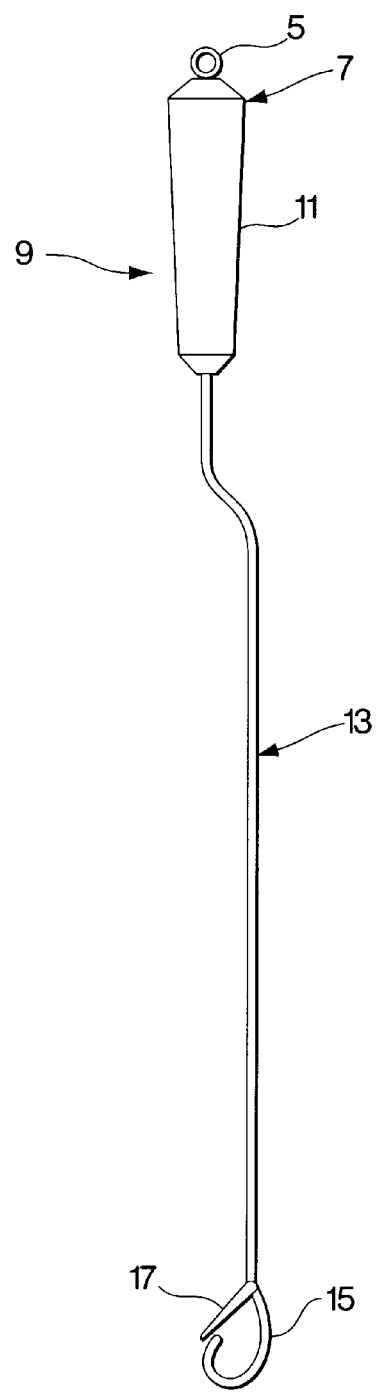

FIG. 1B depicts another embodiment of a pulling tool 9 according to the present invention. This figure shows a tool 9 with a handle 11 with a proximal end 7 and a distal end attached to an elongate member 13 extending distally. At the distal end of the elongate member 13 is situated a hook 15 which is closable by a latch 17. The hook 15 is dimensionally adapted for holding a strand of yarn. The yarn is held in place by the closure of the latch 17.

Figure 2A:
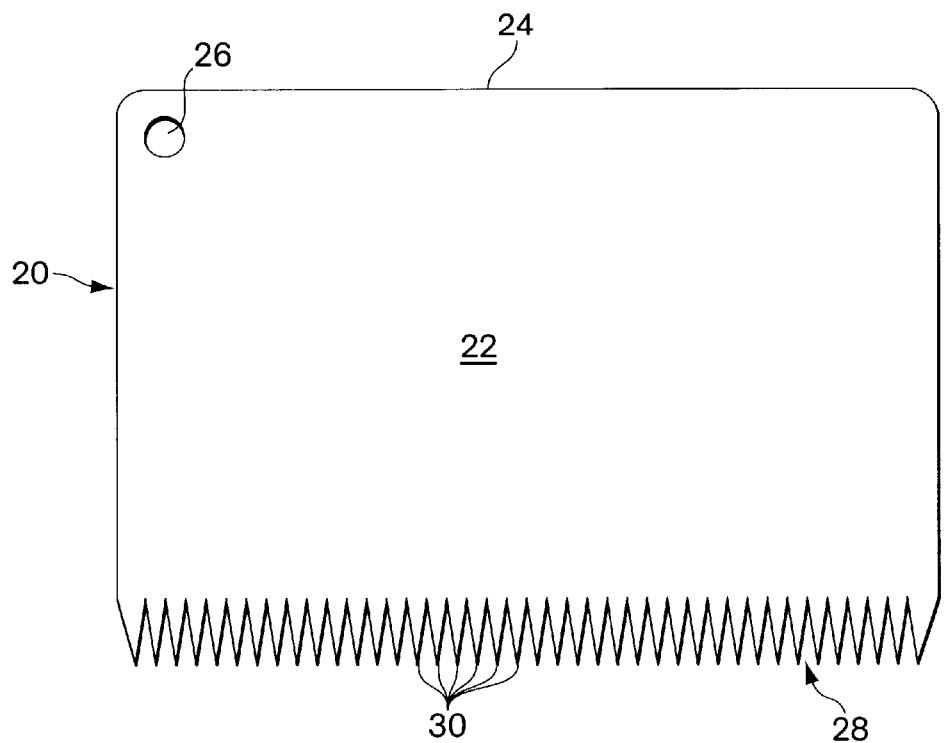
FIGS. 2A–C depict embodiments of a cutting comb according to the present invention.
Figure 2B:
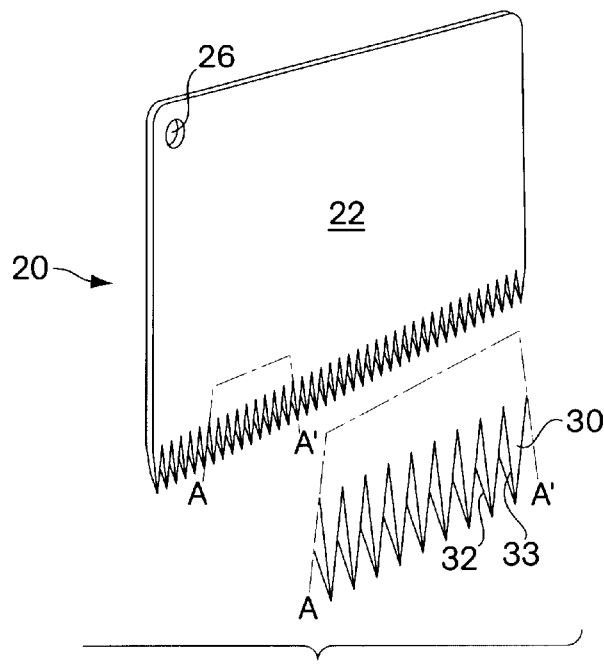
Figure 2C:
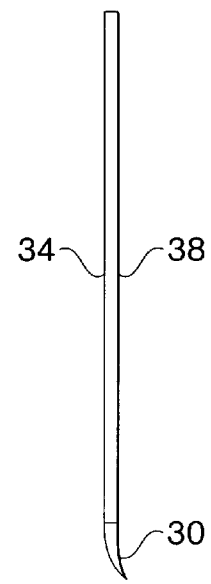

In another embodiment, the present invention comprises a tool, as shown in FIGS. 2A–C, for shortening the manes and tails of horses. Such a tool may be described as a cutting comb. This tool may be used for shortening the manes and tails of horses. Use of this tool permits shortening hair by teasing and cutting it to yield a tapered, rather than blunt bottom line of the mane or top of the tail (near to where it extends out of the rump). This makes the horse look more fashionable and makes it easier to braid the horse's hair.

FIGS. 2A–C show features of an illustrative embodiment of a cutting comb. FIG. 2A provides a frontal view of the tool 20, showing a plate 22 with a proximal end 24 and a distal end 28. The distal end 28 bears a plurality of evenly spaced teeth 30 tapering from proximal to distal. FIG. 2B shows a perspective view of the tool 20 showing the top side 24. The plate 22 bears a hole 26 permitting the tool 20 to be carried on a cord or a flexible belt. It is understood that the hole 26 shown in the present illustration can be replaced by any fastener suitable for affixing the tool 20 to an appropriate carrying device. While the plate 22 is shown in this illustration as flat and even, modifications can be readily envisioned by skilled artisans that may make the plate 22 easier for the groomer to hold and to control. The plate 22 accordingly can be curved or can be indented as indicated by the user's needs. Furthermore, the surface of the plate 22 can be textured or equipped with irregularities intended to provide a more secure grip. FIG. 2B also shows the position of the teeth 30 at the distal end of the plate, with an inset of the section A–A' to show teeth structure in more detail. The inset shows a plurality of teeth 30, each tapering as it extends distally with a proximal bevel to provide at least one cutting edge. The inset shows in more detail a flat inner surface 32 of one of the teeth 30, with a cutting edge 33 depicted. Other shapes of teeth 30 may be envisioned by skilled artisans, with cutting edges 33 positioned thereupon. FIG. 2C shows a side view of an embodiment of a tool according to the present invention, illustrating a top surface 34 and a bottom surface 38 with the teeth 30 curving inward towards the bottom surface 38. Teeth may be curved or uncurved. In one embodiment, the cutting comb may be made of a metal such as aluminum or stainless steel. In another embodiment, all or part of the cutting comb may be made of other materials alone or in combination, including plastics, ceramics and metal. In a preferred embodiment, its dimensions are 3"×2"⅛". Along one of the long sides are a plurality of teeth, for example, 35 teeth which extend ½" into the plate of the tool. In one embodiment, spaces between the teeth are ¹⁄₁₆" at the edge and taper to the base of the teeth. The teeth on either end are thicker than the teeth between them. Sharp edges of the teeth are the inner edges and base of each tooth, on the bottom side of the plate. In the upper left portion (⅛" form the corner) of the tool is a hole, ¼" in diameter through which a metal ring or other connecting device may be employed from which to hang or clip the blade to one's person or storage unit.

To use the depicted cutting comb, one may grab several hairs along the hairline, tease other hairs above the desired length by holding the plate of the tool and pull the plate toward the ground to cut the hair. In this manner hair tapers and shortens. The tool can also be used to even out the length of hair without actually pulling the hair out by the roots.

Figure 3:
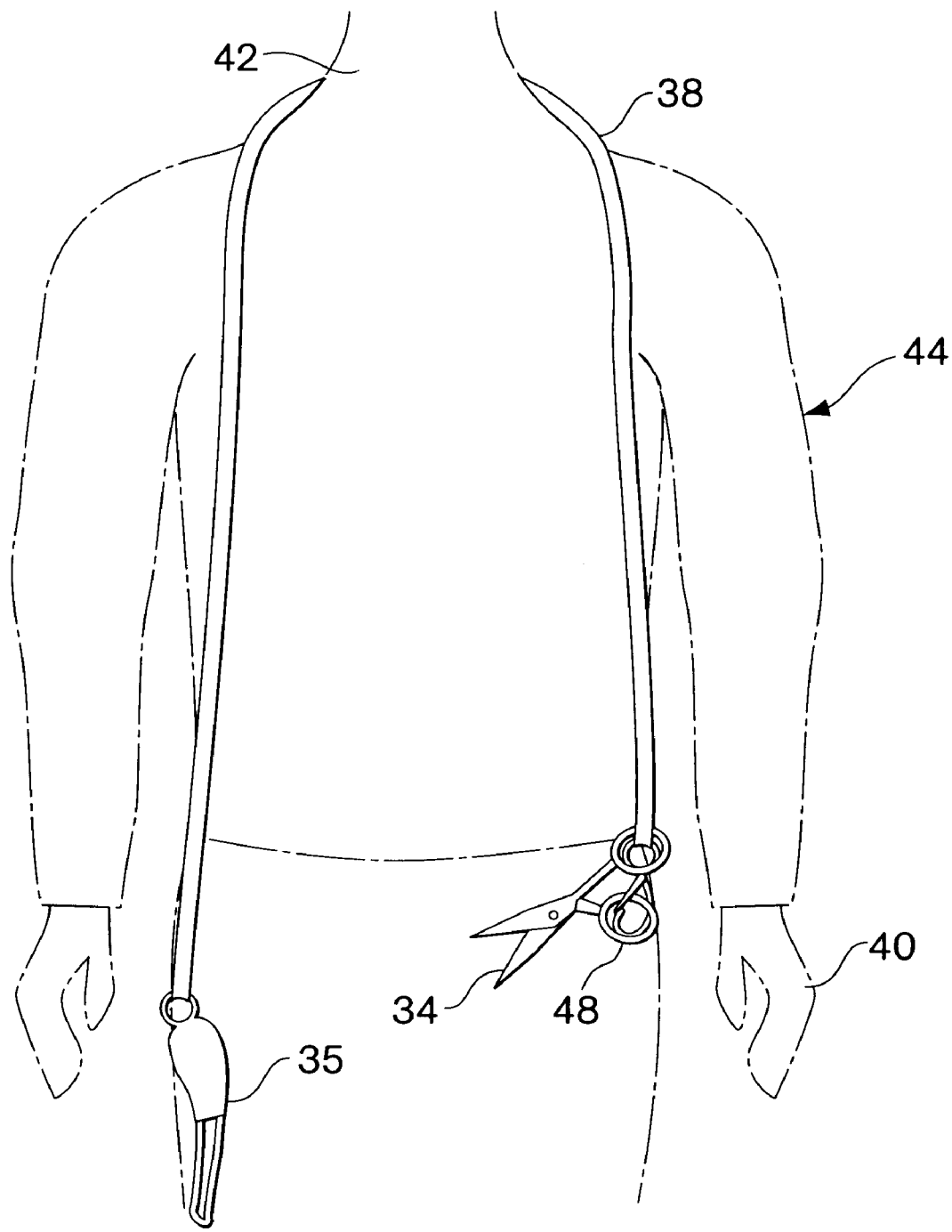
FIG. 3 shows a kit according to the present invention positioned around the neck of a groomer.

FIG. 3 illustrates an embodiment of a kit according to the present invention. The kit includes a pulling tool 35, a cutter 34 and a cord 38 to which the tools are attached. The cord 38 is positioned around the neck 42 of a groomer 44. The cord 38 is of such a length as to position the tools conveniently to a groomer's hand 40. This positioning at hand level makes the tools easy to access, eliminating the inconvenience and possible hazards associated with groping for implements during the braiding process. Since the cord 38 to which the tools are affixed can slide across the back of the groomer's neck 42, the kit has flexibility if one tool is being used and the animal then moves. In one embodiment, the cord 38 can slide through the handles 48 of the cutter 34, thus tending to hold the cutter in a closed position. The cord can be made of any flexible material. Further, the cord can have a pad or a thicker section to be positioned on the dorsum of the neck 42, to make the kit more comfortable for the groomer 44 to wear.

In one embodiment, the kit can include a cutting tool 34, a pulling tool 35, and a cord 38 made of cloth, leather or webbing. The cord 38 has the cutting tool 34 attached to one end and the pulling tool 35 attached to the other. The cord 38 is placed over the neck 42, suspending the tools within easy reach of the groomer 44. The cord 38 may be adjustable in length or fixed. Clasps, cordlocs, rings, rivets, buttons, rungs, hooks and closed hooks may be used to affix the cord 38 to the attached tools. The tools are used for several purposes. The cutting tool 34 is used to cut yarn and hair. The pulling tool 35 is used to pull the yarn of each braid though the crest of the mane to assist in tying and securing the braid to the neck. When braiding tails, the pulling tool 35 is also used to feed yarn through the French braid in order to secure it. The kit provides a convenient and accessible way for the groomer to employ the tools without having to search for them and without mislaying them. Other tools can be incorporated into the kit along with the aforementioned pulling tool 35 and cutter 34. The cord 38 can have additional fasteners to permit additional tools to be secured thereon in an easily available way.

One practice of a method according to the present invention involves the steps of providing for the groomer a grooming apparatus that includes a cord positionable about the neck, a pulling tool and a cutter, and using this grooming apparatus than to braid the mane of a horse or other animal. Several steps are involved in the braiding process. Preliminarily, in certain embodiments, the mane hair may be cut to a preselected length using a cutting comb. Advantageously, the cutting comb can tease the mane hair and cut it to a plurality of slightly different lengths. Proper cutting makes the hair easier to braid and produces a more attractive end result. A section of mane hair may then be selected wherein a braid is to be formed. A first portion of the section is braided, using techniques well-known in the art. After a certain amount of braiding has been performed, braiding is then carried out in a second portion of the hair section to include a strand of yarn that is incorporated in the braid. Once the complete braid has been formed, the strand of yarn is secured around the braid using techniques familiar to skilled artisans. The pulling tool is then used to pull the distal end of the complete braid under a proximal portion of mane hair. In certain practices, this step effects the folding of the braid upon itself in an aesthetically pleasing manner. The pulling tool may be passed through the proximal portion of horse mane hair towards the complete braid so that the tool may engage the distal braided portion and pull the distal braided portion back into the proximal portion of mane hair. The pulling tool may, alternatively, engage the yarn secured around the braid and use the yarn as a leash for pulling the distal braided portion back into the proximal portion of mane hair. The configuration of the distal portion of the pulling tool is selected to permit the easy engagement and disengagement of the yarn or the distal braided portion, as desired by the groomer. Once the distal portion of the complete braid has been pulled into the proximal portion of mane hair, it is secured in this position. Securing may take place by knotting the yarn around the braid using techniques wellknown in the art. When the braid has been secured in this position, excess yarn is trimmed using the cutter.

In braiding a horse mane, speed is a vital element. A number of braids must be formed in a mane being groomed. Unnecessary prolongation of the braiding procedure may add to the show horse's stress. Therefore, presenting the tools necessary for braiding in a convenient and easily accessible way is of paramount importance, a feature incorporated in the present invention. During the braiding process, there is always the possibility that the horse will become uncooperative. Sudden movements can dislodge tools from their positions of access or use and potentially can injure the horse or the groomer. The present invention provides a means of retaining the tools so that they remain readily accessible while avoiding rigid fixation that could produce injuries.

The many features and advantages of the present invention can be appreciated from the foregoing description. Further, since numerous modifications and changes will readily occur to those skilled in the art, it is not desired to limit the invention to the exact construction and operation as described herein. Hence, all suitable modifications and equivalents may be resorted to as falling within the scope of the invention.

I claim:

1. An apparatus for grooming an animal, comprising:
   a flexible belt positionable over a neck of a groomer with an end and an other end;
   a pulling tool affixable to the one end of the flexible belt, said pulling tool having a shank with a proximal end and a distal end, said distal end bearing a loop dimensionally adapted for retaining a strand of yarn and said proximal end bearing a handle, said handle having a first fastener by which said pulling tool may be affixed to the end of said flexible belt; and
   a cutter for cutting yarn, said cutter having a second fastener by which said cutter may be affixed to the other end of said flexible belt;
   wherein, when said belt is positioned over the neck, the pulling tool and the cutter are each reachable by a hand of the groomer.

2. The apparatus of claim 1, wherein the flexible belt, when positioned over the neck, is dimensionally adapted for positioning the pulling tool and the cutter at a level between the groomer's waist and upper thigh.

3. The apparatus of claim 1, wherein the belt bears a plurality of fasteners for attaching a plurality of tools to said belt.

4. The apparatus of claim 1, further comprising a comb detachably attachable to said belt.

5. The apparatus of claim 4, wherein said comb comprises a plate with a top side, a bottom side, a proximal end, a distal end and two lateral edges, said proximal end being graspable by the hand of the groomer, and said distal end bearing a plurality of teeth, each of said teeth tapering as it extends distally, and each of said teeth being beveled proximally to provide at least one cutting edge.

6. A kit for grooming an animal, comprising:
   a cord dimensionally adapted for positioning around a neck of a groomer, said cord bearing a first fastener on a first end and a second fastener on a second end;
   a pulling tool comprising an elongate central member with a proximal and a distal end, a handle adjoining the proximal end of the central member, and a loop adjoining the distal end of the central member, said handle being affixable to the first fastener, and said loop being dimensionally adapted for carrying within it a strand of yarn; and
   a cutter for cutting yarn, said cutter being affixable to the second fastener.

7. The kit of claim 6, further comprising a comb.

8. The kit of claim 7, wherein the comb comprises a plate with a top side, a bottom side, a proximal end, a distal end and two lateral edges, said proximal end being graspable by a hand of a groomer, and said distal end bearing a plurality of teeth, each of said teeth tapering as it extends distally, and each of said teeth being beveled proximally to provide at least one cutting edge.

9. The kit of claim 6, wherein the comb is affixable to the cord.

10. A method for grooming an animal, comprising:
    providing a grooming apparatus comprising a cord with one end and an other end, said cord dimensionally adapted for positioning around a neck of a groomer, a pulling tool affixable to the one end of the cord, and a cutter affixable the another end of to the cord;
    positioning the grooming apparatus around the neck of the groomer;
    separating a section of animal mane hair;
    braiding a first portion of the section;
    braiding a second portion of the section to include a strand of yarn;
    securing the strand of yarn when a complete braid has been formed;
    pulling with the pulling tool a distal end of the complete braid under a proximal portion of animal mane hair;
    securing said distal end under said proximal portion; and
    trimming excess yarn with the cutter.

11. The method of claim 9, further comprising:
    providing a cutting comb; and
    using said cutting comb to cut the animal mane hair to a preselected length.

* * * * *